(12) United States Patent
Gillissen

(10) Patent No.: US 7,934,893 B2
(45) Date of Patent: May 3, 2011

(54) QUICK-CHANGE AND PLUG EJECT ARBOR FOR A HOLE SAW

(75) Inventor: Hubert Gillissen, Zoetermeer (NL)

(73) Assignee: A.V. Custom Style B.V., Zoetermeer (NL)

( * ) Notice: Subject to any disclaimer, the term of this patent is extended or adjusted under 35 U.S.C. 154(b) by 403 days.

(21) Appl. No.: 11/721,383

(22) PCT Filed: Dec. 10, 2004

(86) PCT No.: PCT/NL2004/000862
§ 371 (c)(1),
(2), (4) Date: Jun. 11, 2007

(87) PCT Pub. No.: WO2006/062388
PCT Pub. Date: Jun. 15, 2006

(65) Prior Publication Data
US 2009/0252567 A1  Oct. 8, 2009

(51) Int. Cl.
  *B23B 51/05* (2006.01)
(52) U.S. Cl. ............ 408/68; 408/204; 408/238; 279/77; 279/97
(58) Field of Classification Search .................. 408/68, 408/204, 201, 206, 207, 209, 238–240; 279/77–82, 279/89, 97; *B23B 51/04, 51/05*
See application file for complete search history.

(56) References Cited

U.S. PATENT DOCUMENTS

| 14,876 | A | * | 5/1856 | Lettington | 279/77 |
| 37,196 | A | * | 12/1862 | Kelly | 279/77 |
| 546,761 | A | * | 9/1895 | Fink | 279/77 |
| 646,489 | A | * | 4/1900 | Cook | 279/81 |
| 666,509 | A | * | 1/1901 | Furbish | 279/79 |
| 799,787 | A | * | 9/1905 | Gessert | 279/77 |
| 1,279,302 | A | * | 9/1918 | Dunlap | 408/193 |
| 1,433,527 | A | * | 10/1922 | Browand | 279/81 |
| 1,862,337 | A | * | 6/1932 | Emrick | 279/90 |
| 2,667,357 | A | * | 1/1954 | Andreasson | 279/81 |
| 2,767,991 | A | * | 10/1956 | Emrick | 279/80 |
| 2,894,759 | A | * | 7/1959 | De Bruin | 279/97 |
| 2,931,659 | A | * | 4/1960 | Novkov | 279/35 |
| 3,030,121 | A | * | 4/1962 | Scott | 279/97 |
| 3,726,533 | A | * | 4/1973 | Lafferty, Sr. | 279/97 |
| 4,148,593 | A | * | 4/1979 | Clark | 408/204 |
| 4,514,117 | A | * | 4/1985 | Scott | 408/239 R |
| 4,809,995 | A | * | 3/1989 | Ramunas | 279/77 |
| 5,011,344 | A | * | 4/1991 | Johnson | 408/240 |

(Continued)

FOREIGN PATENT DOCUMENTS

CA   2 283 453   3/2001

(Continued)

*Primary Examiner* — Daniel W Howell
(74) *Attorney, Agent, or Firm* — Oblon, Spivak, McClelland, Maier & Neustadt, L.L.P.

(57) ABSTRACT

Described is a quick-change arbor for a tool, in particular a hole saw (2), the arbor comprising a longitudinal body (3) having a drive end and a tool end, means (6) for attaching the tool which are provided with a central hole allowing a sliding of the attachment means (6) over the longitudinal body (3), and means for rotationally and axially locking the attachment means (6) to the longitudinal body (3). The attachment means (6) are slidably releasable from the longitudinal body (3), and can after applying a latch (9-1) in the attachment means (6) simply be slid over the body in order to push a plug of the sawn material out of the hole saw (2).

17 Claims, 2 Drawing Sheets

U.S. PATENT DOCUMENTS

| | | | |
|---|---|---|---|
| 5,049,013 A * | 9/1991 | Engles et al. | 409/231 |
| 5,076,741 A | 12/1991 | Littlehorn | |
| 5,082,403 A * | 1/1992 | Sutton et al. | 408/68 |
| 5,096,341 A * | 3/1992 | Despres | 408/68 |
| 5,246,317 A | 9/1993 | Koetsch et al. | |
| 5,813,802 A * | 9/1998 | Ajimi et al. | 408/68 |
| 6,379,089 B1 * | 4/2002 | Sugiura et al. | 408/204 |
| 6,409,436 B1 * | 6/2002 | Despres | 408/68 |
| 6,623,220 B2 * | 9/2003 | Nuss et al. | 408/204 |
| 6,705,807 B1 * | 3/2004 | Rudolph et al. | 408/1 R |
| 2004/0161313 A1 * | 8/2004 | Nordlin | 408/204 |
| 2004/0179911 A1 * | 9/2004 | Keightlev | 408/204 |
| 2005/0025592 A1 * | 2/2005 | Cantlon | 408/204 |
| 2007/0160434 A1 | 7/2007 | Gillissen | |

FOREIGN PATENT DOCUMENTS

| | | |
|---|---|---|
| WO | 00 56491 | 9/2000 |
| WO | 2004 011179 | 2/2004 |

* cited by examiner

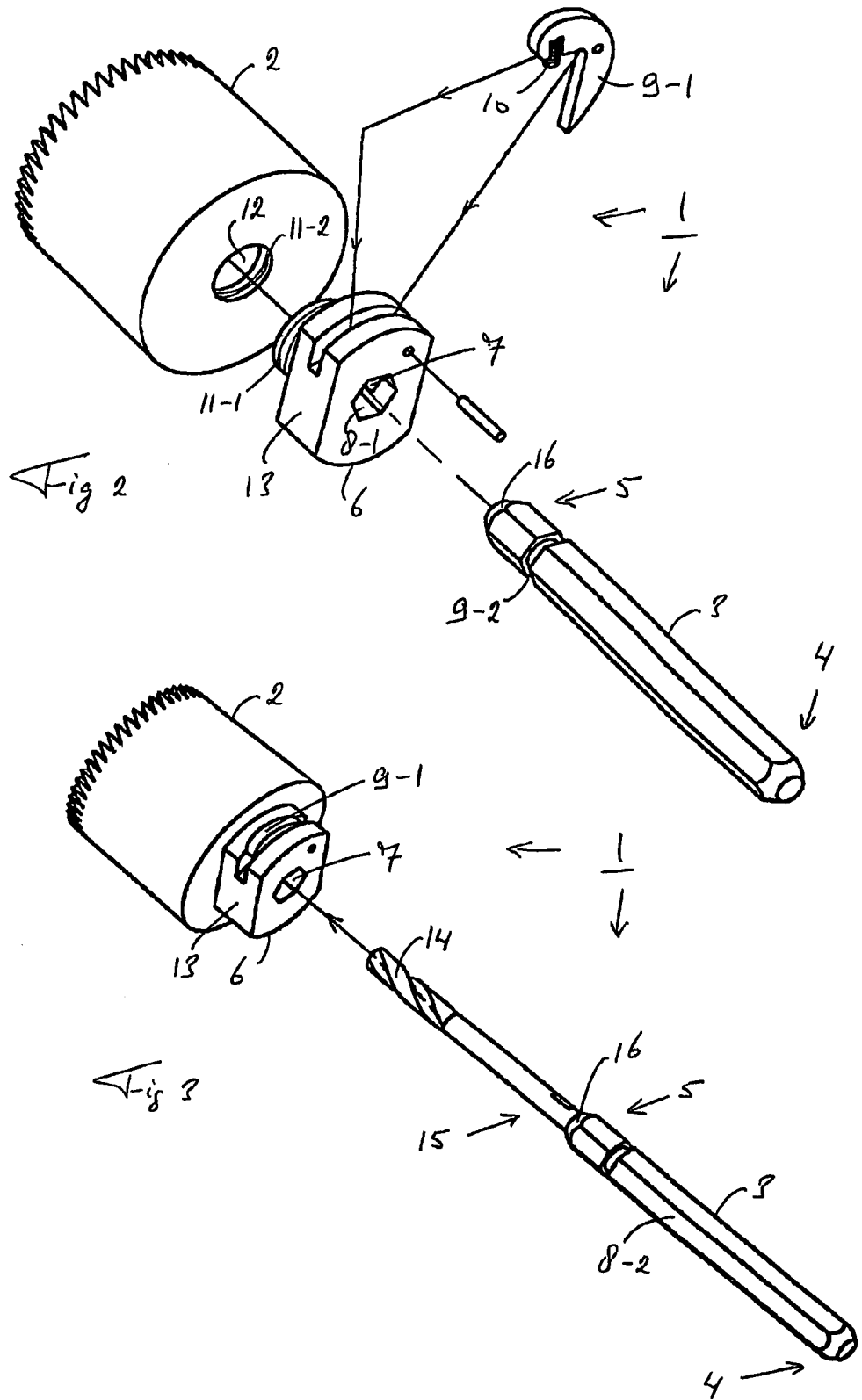

QUICK-CHANGE AND PLUG EJECT ARBOR FOR A HOLE SAW

The present invention relates to a quick-change arbor for a tool comprising: a longitudinal body having a drive end and a tool end; means for attaching the tool, which are provided with: a central hole allowing a sliding of the attachment means over the longitudinal body, and means for rotationally and axially locking the attachment means to the longitudinal body.

The present invention also relates to attachment means for application in the quick change arbor, and to a method for operating the quick change arbor.

Such an arbor is known from WO 01/38028. The known arbor 34 (cf. FIG. 2) comprises a hex-shaped longitudinal body having a drive end for rotating the body, and a tool end adapted to couple to a hole saw tool and adapted to couple to a pilot drill ending in a drill bit. The tool end has an axially slidable selector sleeve allowing a restricted sliding movement over the longitudinal body between three axial positions. In a first operative position the hole saw may be coupled to the arbor. The second position is a spring biased neutral position, and in the second operative position the pilot bit is removable from the arbor. A quick connect coupling assembly is provided on the selector sleeve forming part of means for attaching the hole saw to the slidable selector sleeve in its first operative position. The attachment means are rotationally and axially locked to the longitudinal body by the construction of the selector sleeve. The pilot drill has a detent groove for locking the pilot bit therein. A lock mode is maintained by a bit retention assembly, unless the selector sleeve is moved to its second operative position, wherein the pilot bit is removable from the selector sleeve. The selector sleeve and the attachment means are otherwise fixedly attached to the tool end of the arbor.

Still according to WO 01/38028 a plug of sawn material is ejected from the hole saw during a plug ejection sequence, wherein first the hole saw is uncoupled from the arbor, and secondly use is made of some separate tool to be disposed within an aperture of the hole saw to drive the plug out of the hole saw.

It is a disadvantage of the known arbor that it is complex and can therefore not be manufactured easily and at reduced costs.

It is an object of the present invention to provide a constructionally and functionally simplified arbor, which may be manufactured more easily and at a reduced cost price.

Thereto the quick-change arbor according to the invention is characterised in that the attachment means are slidably releasable from the longitudinal body.

It is an advantage of the quick-change arbor according to the present invention, that the attachment means allow the use of a longitudinal body where over the releasable attachment means are capable to slide. This way it will no longer be required to couple two shafts, that is a pilot bit shaft through the attachment means to the drive shaft end, as the pilot bit itself will form the longitudinal body, which now includes the drive end. This reduces the number of separate parts of the quick-change arbor and leads to a considerable overall simplification.

An embodiment of the method according to the invention has the features, wherein attachment means of a quick change arbor, which means may be coupled to a hole saw, are being attached to a longitudinal body, are locked against rotation and are axially locked both relative to the longitudinal body, whereby after drilling a hole in a material the longitudinal body, after having axially unlocked the attachment means from the longitudinal body, is shifted through the attachment means, while the shifting force is being used to push a plug of the material out of the hole saw.

It is an advantage of the operational method according to the invention that its is not needed to uncouple the hole saw from the attachment means and thereafter make use of some separate tool to be disposed in an hole saw aperture in order to eject a plug of sawn material from the hole saw, as according to the invention after a generally manual unlocking of the attachment means the tool end of the longitudinal body simply slides through the attachment means to push the plug out of the hole saw somehow. The pushing out may for example be effected by means of the end of the longitudinal body at the side of the hole saw or by means of a protrusion or a ramped part on the pilot drill.

Further advantageous embodiments of the quick change arbor according to the invention are outlined in the dependent claims.

At present the quick change arbor and method according to the invention will be elucidated further together with its additional advantages while reference is being made to the appended drawing, wherein similar components are being referred to by means of the same reference numerals. In the drawing:

FIG. 2 shows the arbor of FIG. 1 with the drill bit removed there from; and FIG. 3 shows the arbor of FIG. 1, wherein the attachment means and the tool being a hole saw are coupled.

Figure 1:
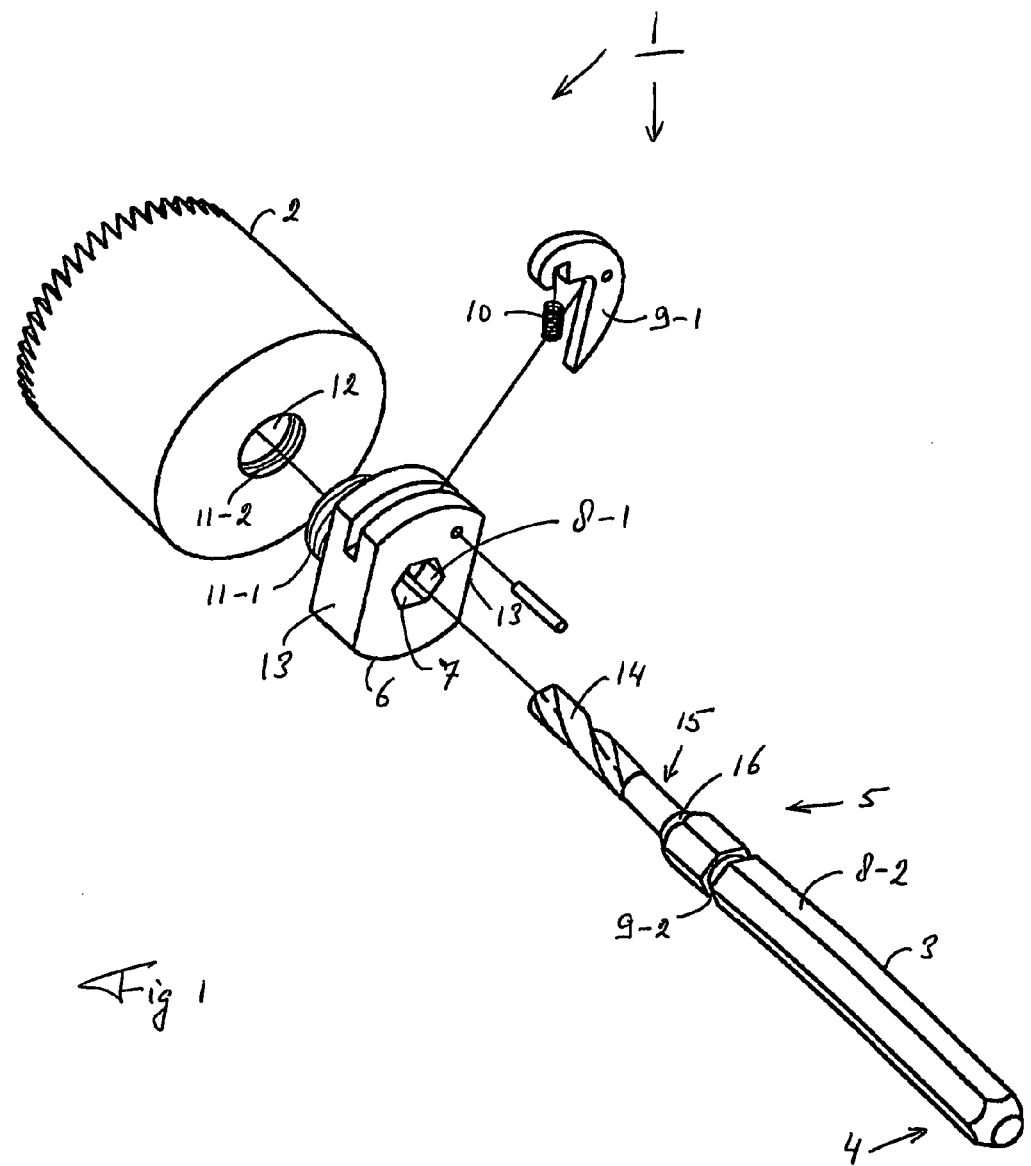
FIG. 1 shows a largely exploded view of a possible embodiment of the quick-change arbor according to the invention.

FIGS. 1-3 show an embodiment of a quick-change arbor 1, which will hereafter be elucidated further while coupled to a tool, in particular but not exclusively to a hole saw 2. Other tools which may possibly be coupled to the arbor 1 are for example a cutter, a circular saw, a drill, a polishing disc or layer, a brush, a bore tool, a grinding tool or the like tools, in order to create a multi purpose tool change system.

The quick-change arbor 1 comprises a longitudinal body 3 having a drive end 4 and a tool end 5 and means 6 for attaching the tool, hereafter attachment means 6. The attachment means 6 are provided with a central through going hole 7 such that a sliding of the attachment means 6 over the longitudinal body 3 is possible. The attachment means 6 also have means 8, 9 to described hereafter for rotationally and axially locking the attachment means 6 onto the longitudinal body 3. Several implementations including mechanical reversed embodiments thereof are feasible for the skilled person. The attachment means 6 are slidably releasable from the longitudinal body 3.

In variants of the embodiment of the arbor 1 the rotationally and axially locking means 8, 9 are releasable locking means, embodied with well known clamps, bolds, wedges or screws to lock the attachment means 6 onto the body 3.

As shown here the rotationally locking means 8 comprise first rotationally locking means 8-1 provided on the attachment means 6 and embodied by the form of the cross section of the central hole 7 in the attachment means, and second rotationally locking means 8-2 embodied by the external form of the longitudinal body 3, which form corresponds to said cross section in such a way that the first and second rotationally locking means 8-1 and 8-2 are slidable relative to one another. The form of the cross section of the central hole 7 and the corresponding external form of the longitudinal body 3 are such that in rotationally locking condition rotation relative to one another is blocked. Possible cross sections and corresponding external forms are for example at least partly or substantially oval, polygonal, such as hexagonal or square.

It is also feasible to provide one or more flattened areas the abovementioned forms in order to prevent relative angular rotation. When the drive end 4 is coupled to a drill or drilling machine rotation of the body 3 will then be transferred to the attachment means 6 and to the tool, such as the hole saw 2 coupled thereto. Of course other variants of the locking means are possible not particularly restricted to the mentioned form and cross section. Some pin-hole locking mechanism possibly both for rotationally and axially locking the means 6 to the body 3 will do the job too for cases wherein the body 3 and the central hole 7 both have a circular cross section.

The axially locking means 9 comprise first axially locking means 9-1, here simply embodied by a latch 9-1 provided on the attachment means 6, and second axially locking means 9-2, here embodied by a notch 9-2 on the longitudinal body 3 for locking the latch 9-1 therein. The latch 9-1 and notch 9-2 as shown are transverse to the longitudinal axis of the body 3. Axial movement of the attachment means 6 relative to the body 3 is thus blocked. Such a latch if for example used in an electric drill will normally be manual operated. The latch itself can be elastic and/or can be loaded elastically, such that it can be depressed or switched easily. In the embodiment as shown the latch has a spring 10, in order to provide a spring loaded latch 9-1. In general the latch 9-1 will be a radially operable latch 9-1 and can also be embodied by a catch falling into a hole in the body 3. Here the latch 9-1 is able to hinge transversely in the attachment means 6. The notch 9-2 is a groove, as shown an annular groove such that in any angular position of the attachment means 6 on the body 3 the latch 9-1 can effectively fall into the notch 9-2.

Although the attachment means 6 may be permanently fixed or united with the tool, the attachment means 6 as shown comprise coupling means 11, in particular releasable coupling means for coupling to the tool 2. The coupling means include for example a threaded stem 11-1 or a bayonet closure for releasable coupling of the attachment means 6 to the tool 2. As shown the hole saw 2 has an hole 12 provided with an internally corresponding thread 11-2. The attachment means 6 and/or possibly the tool 2 comprise parts, such as wrench parts 13 or holes respectively for the coupling and uncoupling of the tool 2.

If the tool is a hole-saw 2, as shown, then it is preferred to have coupling means 11-1, 11-2 which are hollow and have an area allowing sliding of the longitudinal body 3 through the hole 7 into the hole-saw 2 for pushing out a plug of sawn material which will after sawing normally be trapped in the hole saw 2.

The tool end 5 is provided with an axial hole for accommodating a drivable end of a tool, such as here a pilot drill 14. The drivable end 15 of the pilot drill 14 and the tool end 5 of the body 3 are each provided with corresponding means for attaching and detaching the pilot drill 14. These means may be a click closure, some clamp means, or screw thread on both the drivable end 15 and in the axial hole at the tool end 5 of the longitudinal body 3.

It is preferred to manufacture the arbor 1 and its parts from hardened steel.

The method of operating the arbor 1, as far as not yet clear from the above description is largely as follows. If only drilling by means of the pilot drill 14 is required then the pilot drill 14 is coupled to the tool end 5 and the drive end 4 is then coupled to the drill machine. If in addition thereto or apart there from a tool is to be used, then the tool is coupled to the attachment means 6 which are slid onto the body and the transverse spring loaded latch 9-1 provided on the attachment means 6 will automatically fall in the transverse notch 9-2 to lock the means 6 onto the body 3, both against axial and rotational movement. The tool end 5 is beveled such that if sliding of the attachment means 6 starts at the begin of the tool end 5 the bevel 16 will initially lift the latch 9-1 against the spring or elastic force.

If the hole saw 2 is used, normally in combination with the pilot drill 14, then after coupling the hole saw 2 to the attachment means 6, the means 6 will be slid onto the body 3 as described in the above. After having drilled a hole in a material by the hole saw 2 the longitudinal body 3, after having axially unlocked the attachment means 6 from the longitudinal body 3 by depressing the latch 9-1, can be shifted further into the holes 7 and 12. This way the possibly beveled end 5 of the longitudinal body 3 is being used to push the plug of the material out of the hole saw 2, without any tool or decoupling of a tool being necessary. The attachment means 6 may also be united and included in the tool, in particular the hole saw 2. The drill 14 may also be united and included in the body 3.

The invention claimed is:

1. A quick-change arbor for a tool, comprising:
a longitudinal body having a drive end, a tool end and a transverse notch;
an attachment body, slidably releasably connectable to the longitudinal body to be driven for rotation by driving the drive end of the longitudinal body, wherein the attachment body includes:
means for coupling the attachment body to a tool;
a central hole sized and configured to slidably and non-rotatably accept the longitudinal body therein, and
a transverse latch provided on the attachment body,
wherein the transverse latch is sized and configured to engage the transverse notch, when the longitudinal body is slidably and non-rotatably accepted in the central hole of the attachment body, to axially lock the longitudinal body in the attachment body, wherein the tool is a hole-saw, and the means for coupling are hollow having an area allowing sliding of the longitudinal body through the hollow into the hole-saw for pushing out a plug of sawn material.

2. The quick-change arbor according to claim 1, wherein said transverse latch is movable to releasably axially lock the longitudinal body in the attachment body.

3. The quick-change arbor according to claim 1, wherein said central hole and said longitudinal body have corresponding cross sections to permit sliding of the longitudinal body and the attachment body relative to one another.

4. The quick-change arbor according to claim 1, wherein said central hole and said longitudinal body have corresponding cross sections to prevent rotation of the longitudinal body and the attachment body relative to one another.

5. The quick-change arbor according to claim 1, wherein in cross section, an external form of the attachment body is one of oval, polygonal and a configuration exhibiting partly flattened areas.

6. The quick-change arbor according to claim 1, wherein said transverse latch is manually operated.

7. The quick-change arbor according to claim 1 wherein the latch is spring loaded.

8. The quick-change arbor according to claim 1 wherein the latch is mounted to move radially.

9. The quick-change arbor according to claim 1, wherein the notch is an annular groove.

10. The quick-change arbor according to claim 1, wherein the means for coupling comprise a threaded stem or a bayonet for coupling to a correspondingly equipped tool.

11. The quick-change arbor according to claim 1, wherein one of the means for coupling and the tool comprises wrench parts or holes respectively for the coupling and uncoupling of the tool.

12. The quick-change arbor according to claim 1, wherein the tool end is provided with an axial hole for accommodating a pilot drill.

13. The quick-change arbor according to claim 12, wherein the axial hole is provided with means for attaching and detaching the pilot drill.

14. The quick-change arbor according to claim 1, wherein the arbor is at least partly manufactured from hardened steel.

15. Attachment means for attaching a hole saw, which attachment means are slidably releasable from a longitudinal body having a transverse notch and are provided with:
- an attachment body, slidably releasably connectable to the longitudinal body, wherein the attachment body includes:
  - a central hole sized and configured to slidably and non-rotatably accept the longitudinal body therein, and
  - a transverse latch provided on the attachment body,
- wherein the transverse latch is sized and configured to engage the transverse notch, when the longitudinal body is slidably and non-rotatably accepted in the central hole of the attachment body, to axially lock the longitudinal body in the attachment body,
- further comprising means for coupling the attachment body to a tool, wherein the means for coupling are hollow having an area allowing sliding of the longitudinal body through the hollow into the hole-saw for pushing out a plug of sawn material.

16. The attachment means according to claim 15, wherein the attachment means are capable to be coupled to the tool, wherein the tool is a hole saw.

17. A tool change system comprising:
- a quick-change arbor comprising a longitudinal body having a drive end, a tool end and a transverse notch; an attachment body, slidably releasably connectable to the longitudinal body to be driven for rotation by driving the drive end of the longitudinal body, wherein the attachment body includes means for coupling the attachment body to a tool, a central hole sized and configured to slidably and non-rotatably accept the longitudinal body therein, and a transverse latch provided on the attachment body, wherein the transverse latch is sized and configured to engage the transverse notch, when the longitudinal body is slidably and non-rotatably accepted in the central hole of the attachment body, to axially lock the longitudinal body in the attachment body; and
- a tool comprising a hole saw, wherein the means for coupling are hollow having a area allowing sliding of the longitudinal body through the hollow into the hole-saw for pushing out a plug of sawn material.

* * * * *